(12) United States Patent
Polatkan et al.

(10) Patent No.: US 10,740,621 B2
(45) Date of Patent: Aug. 11, 2020

(54) STANDALONE VIDEO CLASSIFICATION

(71) Applicant: Microsoft Technology Licensing, LLC, Redmond, WA (US)

(72) Inventors: Gungor Polatkan, San Jose, CA (US); Mahesh S. Joshi, Richmond, CA (US); Fares Hedayati, Sunnyvale, CA (US); Bonnie Bills, Livermore, CA (US)

(73) Assignee: Microsoft Technology Licensing, LLC, Redwood Shores, CA (US)

( * ) Notice: Subject to any disclaimer, the term of this patent is extended or adjusted under 35 U.S.C. 154(b) by 133 days.

(21) Appl. No.: 16/024,804

(22) Filed: Jun. 30, 2018

(65) Prior Publication Data
US 2020/0005047 A1  Jan. 2, 2020

(51) Int. Cl.
*G06K 9/00* (2006.01)
*G06K 9/62* (2006.01)

(52) U.S. Cl.
CPC ..... *G06K 9/00751* (2013.01); *G06K 9/00718* (2013.01); *G06K 9/6268* (2013.01); *G06K 2209/27* (2013.01)

(58) Field of Classification Search
CPC .......... G06K 9/00751; G06K 9/00718; G06K 9/6268; G06K 2209/27

USPC .......................................................... 382/156
See application file for complete search history.

(56) References Cited

U.S. PATENT DOCUMENTS

| | | | | |
|---|---|---|---|---|
| 7,930,419 | B2 * | 4/2011 | Mullig | H04L 29/06027 709/231 |
| 8,649,613 | B1 * | 2/2014 | Leung | G06K 9/00724 382/155 |
| 9,361,377 | B1 * | 6/2016 | Azari | G06F 16/951 |
| 9,615,136 | B1 * | 4/2017 | Emery | H04N 21/47202 |
| 9,785,865 | B2 * | 10/2017 | Zhu | G06K 9/6267 |
| 2016/0353139 | A1 * | 12/2016 | Smith | H04N 21/23424 |
| 2018/0032846 | A1 * | 2/2018 | Yang | G06K 9/00711 |
| 2018/0336931 | A1 * | 11/2018 | Tandon | G11B 27/34 |

* cited by examiner

*Primary Examiner* — Juan A Torres
(74) *Attorney, Agent, or Firm* — Hickman Palermo Becker Bingham LLP

(57) ABSTRACT

Techniques for classifying videos as standalone or non-standalone are provided. Feature (or attribute) values associated with a particular video are identified. Feature values are extracted from metadata associated with the particular video and/or from within a transcript of the particular video. The extracted feature values of the particular video are input to a rule-based or a machine-learned model and the model scores the particular video. Once a determination pertaining to whether the particular video is standalone is made, information about the particular video being a standalone video is presented to one or more users within the network.

20 Claims, 4 Drawing Sheets

FIG. 3

Fig. 4

STANDALONE VIDEO CLASSIFICATION

TECHNICAL FIELD

The present disclosure relates to machine learning and, more particularly to, generating machine-learned models to automatically classify videos based on features associated with the videos.

BACKGROUND

Some web sites host many videos that are associated with each other. For example, a third-party content database uploads a learning course of ten videos about a particular subject. In cases where a viewer prefers, or only has time to indulge in, a standalone video to partake in learning content in small specific bursts, the viewer must manually filter out videos that are a part of a series or online course. Videos (referred to herein as "standalone videos") that can be viewed by themselves without requiring much, if any, information contained in other (e.g., related) videos will only be viewed if a website visitor is searching specifically for them, such as through a search feature provided by the website. However, for web sites that include many videos, it is impractical to manually classify whether each video is a standalone video or a non-standalone.

Thus, one problem faced by administrators of such websites is deciding whether each video has co-dependency with one or more other videos and organizing the videos accordingly. However, an approach for considering whether a video is standalone is to view each video individually manually classify each video. Such an approach is not feasible for large quantities of videos.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for analyzing multiple features related to a set of video items and classifying each video item as standalone or non-standalone. Feature (or attribute) values associated with a particular video are identified. Feature values are extracted from, for example, a transcript of the particular video and/or metadata associated with the particular video. The extracted feature values of are particular video are considered by a rule-based or a machine-learned model and the particular video is classified based on output of the model. If the model is a machine-learned model, then one or more machine-learning techniques are used to "learn" weights of different video-related features, which weights are then used in classifying multiple videos. Once a determination pertaining to whether the particular video is a standalone video is made, information about the particular video is transmitted over a computer network for presentation to one or more users within a network. If a particular video is classified as non-standalone, then information pertaining to that particular video may be prevented from being displayed. Instead, for example, only course-level information regarding a video course that includes the particular video is recommended to one or more end-users. Video-specific information about the particular video may only be displayed in response to user selection of the course-level information.

As described herein, a "standalone video" refers to a video item where content of the video item can be (or there is a high likelihood of being) understood by the general public (or an "average" person) without first viewing one or more other video items (such as a video item within the same course of video items as the standalone video) in order to help understand the content. For example, the content of a standalone video is sufficient enough to serve as a substantive lesson to the viewer regarding a particular topic without requiring content from one or more other videos to understand the substantive lesson. Thus, a standalone video is considered to be independent of any other videos while a non-standalone video is considered to be dependent on one or more other videos. In other words, one or more other videos need to be viewed in order to understand one or more concepts or topics presented in the non-standalone video.

As described herein, a video item includes video data that may be processed a video/media player to render images and, optionally, sounds. Metadata of a video item may include multiple types of information, such as length of the video item, creator/author of the video item, creation date of the video item, last modified date, etc. Metadata of a video item may be included in the video item or may be stored separately from the video item.

Example System

Figure 1:
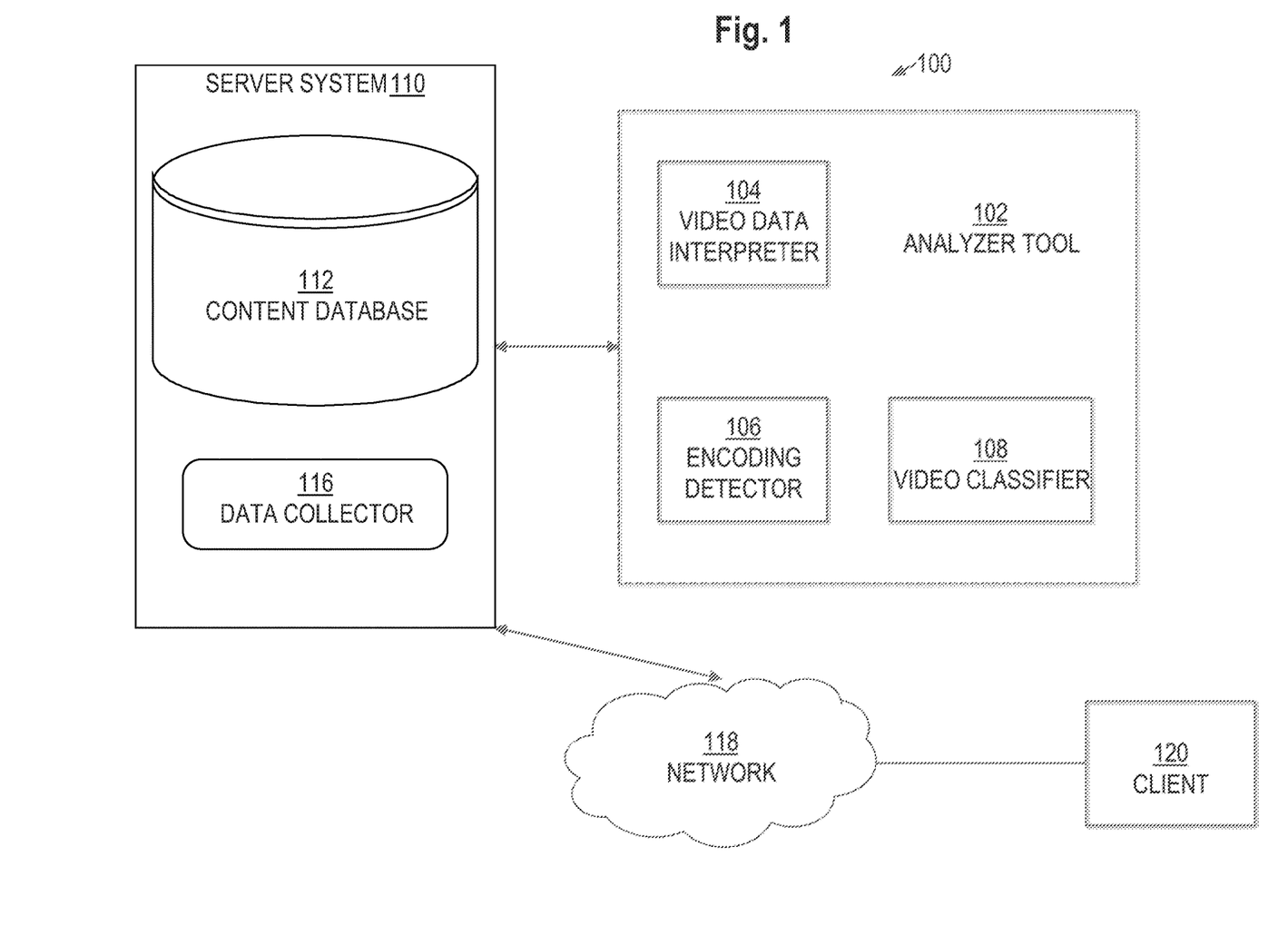
FIG. 1 is an example system in which the techniques described may be practiced according to certain embodiments.

FIG. 1 illustrates an example system 100 in which the techniques described may be practiced according to certain embodiments. System 100 is a computer-based system. The various components of system 100 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. System 100 illustrates only one of many possible arrangements of components configured to perform the functionality described herein. Other arrangements may include fewer or different components, and the division of work between the components may vary depending on the arrangement.

FIG. 1 is an example system for classifying a video as standalone or non-standalone, in an embodiment. System 100 includes an analyzer tool 102 that interacts with a server system 110, which communicates data/information with a client 120 over network 118. System 100 may include more or less client devices. Analyzer tool 102 includes various modules and tools to perform analysis of video data which include a video data interpreter module 104, an encoding detector 106, and video classifier 108. Server system 110 includes a content database 112, which includes videos, and a data collector 116. Client 120 is an application or computing device configured to communicate with server system 110 and receive data from videos analyzed by analyzer tool 102 via network 118. Video data interpreter module 104 retrieves and interprets video data of the video items stored in content database 112. Content database 112 includes video items, metadata, and content items, such as video transcripts containing time references, video annotations, and other video attributes.

In an embodiment, to accurately classify a video item as standalone based on feature values, various feature weights or coefficients are established. The weights may be determined by machine learning techniques such as training a classification model using feature values used to classify previously analyzed video items.

In an embodiment, video data includes co-viewing feature values that account for whether a particular video item within content database 112 is viewed in combination with one or more other video items in content database 112 by a user of network 118. In an embodiment, video items are associated with token embeddings comprising unigrams, bigrams, and n-grams containing words/phrases extracted from a video transcript.

Although only a single client 120 is depicted, system 100 may include multiple clients that interact with server system 110 over network 118. Examples of computing devices include a laptop computer, a tablet computer, a smartphone, a desktop computer, and a Personal Digital Assistant (PDA). An example of an application includes a dedicated application that is installed and executed on a local computing device and that is configured to communicate with content database 112 over network 118. Another example of an application is a web application that is downloaded from a server system and that executes within a web browser executing on a computing device. Client 120 may be implemented in hardware, software, or a combination of hardware and software. Network 118 may be implemented on any medium or mechanism that provides for the exchange of data between client 120 and a server system. Examples of network 118 include, without limitation, a network such as a Local Area Network (LAN), Wide Area Network (WAN), Ethernet or the Internet, or one or more terrestrial, satellite or wireless links.

Server System

Server system 110 may be implemented on a single computing device or on multiple computing devices, and content database 112 may be a database, repository, or any other entity capable of storing and supplying information for use in a network. Each of content database 112 and data collector 116 may be implemented in software, hardware, or any combination of software and hardware. Although depicted separately, content database 112 and data collector 114 may be implemented as one component.

Content database 112 stores videos, video data, and content items of the videos, such data that is used to generate attributes and features of videos in order to classify a video as standalone or non-standalone. A content item might not have any links to other content items. Example content items include extractions from video content, such as texts and images. Example formats of videos stored in content database 112 include but are not limited to MPEG (.mp4), Matroska (.mkv), Audio Video Interleave (.avi), and Flash Video (.flv).

Content database 112 provides analyzer tool 102 with videos, for which analyzer tool 102 utilizes its tools and components to perform decoding and analysis for compressed and/or uncompressed videos.

Analyzer Tool

For a particular video, analyzer tool 102 performs video data extraction, audio/visual codec, and content item/video data analysis. Analyzer tool 102 utilizes video data interpreter module 104 to extract and interpret video data from a particular video within content database 112. Video data interpreter module 104 may access content item records stored in the particular video that include static content items and other information such as audio, images, and dialogue within the transcript of the particular video. Video data interpreter module 104 can convert content items to various formats for processing by analyzer tool 102. Encoding detector 106 may receive digital data streams pertaining to the particular video file from content database 112 and provide codec details and statistics including but not limited to the data type of the stream, resolution, frame rate, sample rate, channels, and bits per sample.

In an embodiment, encoding detector 106 processes information extracted from the data streams by a convolutional neural network via dividing input frames into macroblocks. Alternatively or additionally, encoding detector 106 may perform de-multiplexing and decoding for a particular video in order for analyzer tool 102 to generate attributes and features of a particular video.

Sources for Standalone Classification

Multiple attributes or features may be considered when classifying a video as standalone or non-standalone. Example features for standalone classification include:
 a. co-viewing: when a particular video is viewed or interacted with by a user in combination with one or more other videos, where the viewing of the particular video and the one or more other videos need not be within a certain timeframe or in a particular order. As described herein, "co-viewing" refers to a particular video being viewed by a user in combination with one or more other videos viewed by the same user. For example, when a particular video is viewed by a user and the user views one or more other videos (regardless of the two viewings occurring during the same session), a correlation may be established between the particular video and one or more other videos. Co-viewing features may account for the frequency and recency a particular video is viewed in combination with one or more videos. The frequency and recency may account for the amount of time that has elapsed between the viewing of the particular video and one or more other videos.
 b. embeddings: unigram, bigram, and n-grams based on words extracted from the video transcript of a particular video that are equivalent or related to words or phrases within the video transcript of one or more other videos. As described herein, an embedding is a vector containing textual characters extracted from the video transcript.

c. length of video: the length in time of the video from beginning to end. Generally, the shorter the video, the more likely that the video is standalone.

d. Time Reference Patterns: words or phrases extracted from the video transcript of a particular video item that indicate or refer to past, present, or future events, such as "we'll see", "we'll show", "we've seen", and "as we saw in the previous video".

In an embodiment, the video items that are considered as candidates of co-viewing relative to a particular video item are limited to video items in a course that includes the particular video item. For example, a course provider provides a course that consists of ten video items about the basics of machine learning. In this example, nine co-viewing feature values for a particular video in that course are generated, one for each other video item in the course.

In an embodiment, a time between a user viewing two video items is a factor in generating a co-viewing feature for the two video items. For example, if a user views two video items more than a month apart, then it is as if the user did not co-view those two videos. However, if the user viewed two video items within a month of each other, then a record is generated and stored that indicates that the two video items were viewed together by a single user. Thus, a co-viewing instance may be either 1 (indicating co-viewing) or 0 (indicating no co-viewing).

In a related embodiment, a co-viewing instance may be a value between the maximum (e.g., 1) and the minimum value (e.g., 0). The greater the passage of time between a user viewing two video items (e.g., greater than two weeks), the lower the value of the co-viewing instance for those two video items. Conversely, the lesser the time between a user viewing two video items (e.g., within 3 days), the greater the value of the co-viewing instance for those two videos.

In a related embodiment, different sets of video items may be associated with different recency thresholds. For example, video items from one set of video item/course providers are associated with a week requirement in order to be considered co-viewed while video items from another set of video item/course providers are associated with a month requirement in order to be considered co-viewed. As another example, video items associated with computer technology are associated with a two-week requirement in order to be considered co-viewed while video items associated with marketing are associated with a three-day requirement in order to be considered co-viewed.

Other classification attributes may be related to a relationship between a particular video and one or more other videos within a plurality of videos. Examples of such attributes for standalone classification include:

a. Content relevance: a similarity between content of a particular video and content of one or more other videos within a plurality of videos. For example, topics or subjects within the video transcript of a particular video discussed or related to words pertaining to particular topics or subjects within the video transcript of one or more other video.

Rule-Based Classification Model

Classifying a video based on feature values of a video may be performed in a number of ways. For example, rules may be established that weigh certain attributes for metadata, video items, or other data extracted from video files, and combine the weighted attribute values to generate an output (e.g., a single value) that is used to classify videos as standalone or non-standalone. For example, a video item indicating that a particular video contains the phrase "As we saw in the previous video" is used as an attribute indicating that the particular video might be non-standalone.

Rules may be determined manually by analyzing characteristics of the videos. For example, it may be determined that the length in time of a particular video is below a first threshold and, based on the length in time of the particular video being below the first threshold, the particular video is classified as standalone.

A rule-based classification model has numerous disadvantages. One disadvantage is that it fails to capture nonlinear correlations. Another issue with a rule-based model used for video classification is that the hand-selection of values is error-prone, time consuming, and non-probabilistic. Hand-selection also allows for bias from potentially mistaken business logic. A third disadvantage is that output of a rule-based model used for video classification is an unbounded positive or negative value. The output of a rule-based model does not intuitively map to a classification. In contrast, machine learning methods are probabilistic and therefore can give intuitive classifications.

Machine-Learned Classification Model

In an embodiment, a classification model is generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical or classification model that is trained based on a history of attribute values associated with metadata, content items, and other data extracted from the videos. The machine-learned model is trained based on multiple attributes (or factors) described herein. In machine learning parlance, such attributes are referred to as "features."

To generate and train a machine-learned model, a set of features is specified and training data is generated. The set of features dictates how data that data collector 116 collects is processed in order to generate the training data. For example, if a feature is co-viewing of a particular video with one or more other videos in content database 112, then (1) a number of times in which users viewed the particular video with one or more other videos and (2) the (e.g., average, median) amount of time between users viewing the particular video and viewing the one or more other videos (e.g., immediately, sooner, or later) are determined from access data pertaining to the metadata, content items, or other data extracted from the videos.

In an embodiment, a new machine-learned model is generated regularly, such as every month, week, or other time period. Thus, the new machine-learned model may replace a previous machine-learned model. Newly acquired or changed training data may be used to update the model. For example, additional training data may be added to the model in order to produce a better prediction of standalone classification. As another example, the model may be updated if feature values of the existing training data have been changed. For example, co-viewing features of video items indicated in the training data may have changed. In a related embodiment, an extent to which attributes and values have changed for one or more video items in training data is determined. If, for example, the number of times that each of a certain percentage of the video items (e.g., 15%) in the training data have been viewed since the last training exceeds a particular threshold (e.g., 20 times), then a new model is trained based on updated feature values for each of the video items indicated in the training data Label Generation Training data includes multiple training instances, each corresponding to a different content item or video item. Each training instance includes (1) a label indicating whether the corresponding video item is standalone and (2) feature values of the corresponding video item. During the training phase, a machine-learned model captures the correlation between feature values and labels. The correlation is reflected, at least in part, in the weight or coefficient learned for each feature and for interaction between features.

The type of label used in training data indicates the type of machine-learned model. For example, a label may be 0 or 1: 1 indicating a standalone video and 0 indicating a non-standalone video. Thus, a machine-learned model generated using such label data may be a binary classification model. Even though the machine-learned model may be a classification model, the machine-learned model may still output a continuous value; however, a threshold value may be defined such that an output value above that threshold value is considered to be in one class and an output value below that threshold value is considered to be in another class. As another example, a label may be a value in a range of continuous (e.g., floating point) values, such as between 0 and 1 or between 0 and 100.

Example Classification System

Figure 2:
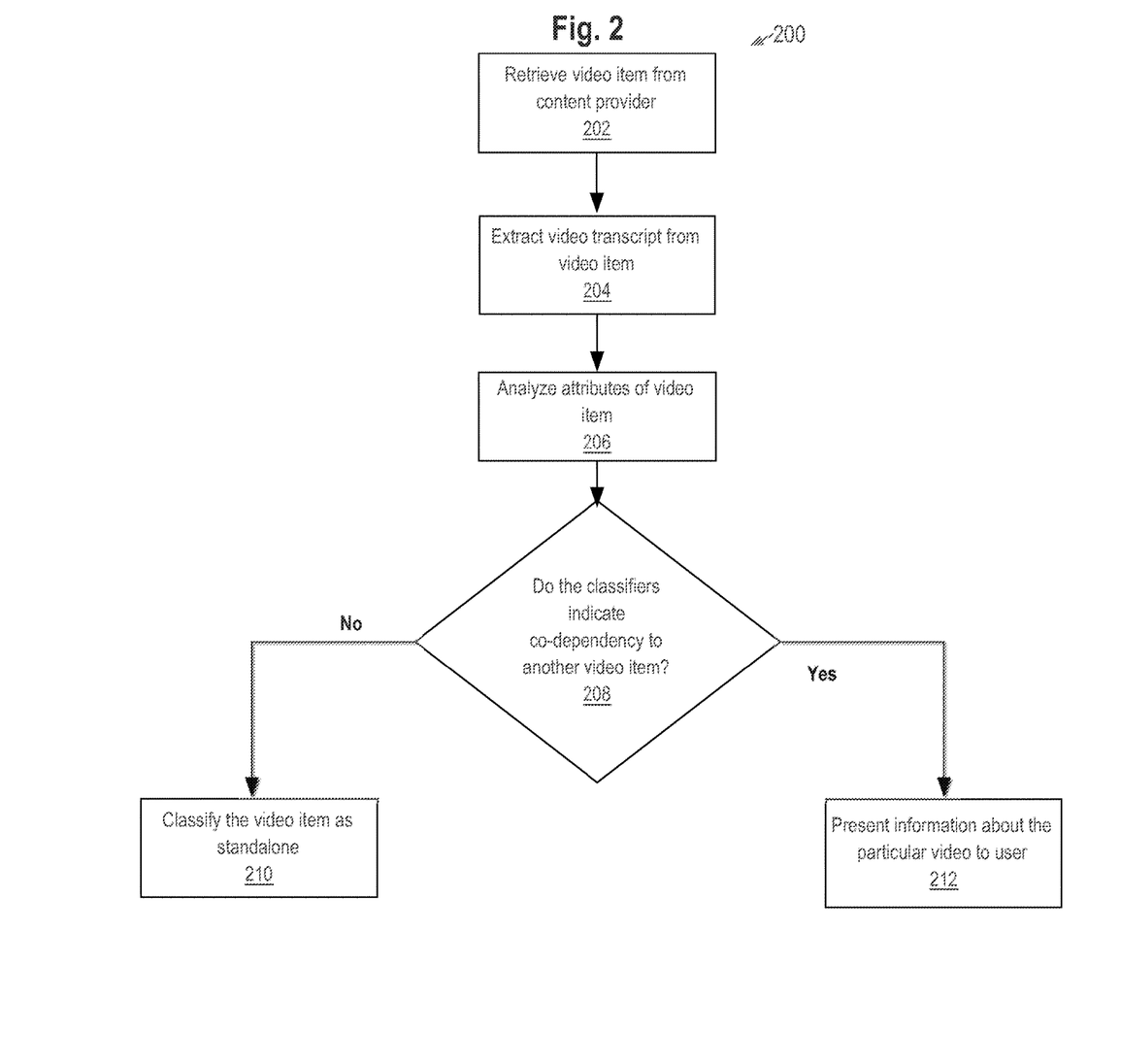
FIG. 2 is a block diagram that depicts a process for classifying standalone videos, in an embodiment.

FIG. 2 is a block diagram that depicts process 200 for classifying videos, in an embodiment. Under the assumption that the machine-learned model has already been trained by the training data (generated by data collector 116) comprising multiple entries where each entry corresponds to a different video item and includes multiple feature values of the corresponding video item, process 200 is implemented. Data collector 116 may generate the training data based on data retrieved from one or more data sources, such as a data source that is internal to server system 110 and/or a data source that is external/remote relative to server system 110. Process 200 may be implemented by different components of server system 110.

At block 202, a particular video item within content database 112 is selected by components within server system 110. The particular video item may be selected based upon input provided by a user associated with client 120 via network 118, or arbitrary selection by server system 110 or network 118.

At block 204, the video transcript is extracted from the particular video item and received by analyzer tool 102. Video transcription may be performed by automatic speech recognition, manual transcribing, or a combination of the two used to generate a textual version of the content of the particular video item. Analyzer tool 102 may perform various functions such as interpreting the time length of the video transcript and keyword extraction based on a regular expression grammar rule approach to identify one or more words or phrases in the text of the transcript.

At block 206, analyzer tool 102 analyzes attributes of the particular video item, such as co-viewing features, data regarding the transcript, time patterns, length of video, and other feature values that may assist in classification of the particular video. In an embodiment, co-viewing features may indicate that the particular video was viewed in combination with another video by a user within a predefined time-frame or for an arbitrary duration. Co-viewing features may also be based on subject matter dependency evidenced through user viewing behavior and viewing behavior of other users that correlate with the user or the user's viewing behavior. Such correlation may be based on factors such as subject matter associated with the particular video item, information from the user's profile, or other information that indicate that a particular video is watched or is likely to be watched with another video. For example, if the particular video is viewed with one or more other videos within a boundless timespan, then co-viewing features may account for a correlation between the particular video and the one or more other videos.

Co-viewing features may also account for dependency between the particular video and one or more other videos. For example, if a dependency is established between the particular video and one or more other videos, then co-viewing features may account for a dependency between the particular video and one or more other videos. As a specific example, if video items A and B are viewed a significant number of times and video item B is viewed immediately after video item A over 80% of the time that video item B is viewed, then this indicates that video item B depends on video item A and, therefore, is more likely to be a non-standalone video. However, even though video items C and D may be independently popular video items from the same video course, there appears to be no order in which those two video items are consumed relative to each other. That, in combination with other features (e.g., short duration and lack of time reference patterns of, for example, video item C) indicates that video item C is standalone.

In an embodiment, included in these multiple feature values (or what may be used to compute a co-viewing feature value) is a time decay correlation value that accounts for the amount of time that has passed between the viewing by a user of the particular video item and the viewing by the user of another video item. For example, the distribution of the time-decaying correlation that the particular video item has been viewed in combination with other videos contains a time decay value that accounts for the recency and frequency the other videos have been watched with the particular video item, in which the more recent and frequently watched video is correlated with the particular video item. The distribution of the time-decaying correlation may be defined by time lapse between the viewing of the particular video and another video and may include the mean, median, maximum, minimum, and various percentiles of correlation between the particular video item and one or more video items. Analyzer tool 102 identifies text within the transcript of the particular video item and analyzes the text for textual features such as whether the text includes pre-defined phrases, tokens, and time reference patterns. The analysis of the text may include identifying tokens within the text, determining an embedding for each token, and aggregating the token embeddings producing textual features. Textual features may include keywords within the video transcript that refer to past, present, or future correlating videos and unigrams, bigrams, and n-grams associated with the particular video item based on topics or semantics identified within the video transcript.

At block 208, video classifier 108 inserts feature values based on co-viewing, the time duration of the particular video item, textual features, and/or other data are into the standalone classification model and, based on an output from the model, makes a determination as to whether the particular video item is a standalone video. All of the feature values are not required in order for video classifier 108 to make the determination.

If output of the classification model indicates that the particular video item is standalone, then process 200 proceeds to block 210, where video classifier 108 classifies the particular video item as standalone. After standalone classification, information pertaining to the particular video item may be presented to client 120 over network 118. Otherwise, process 200 proceeds to block 212, where video classifier 108 classifies the particular video item as non-standalone, and information pertaining to the particular video item and one or more videos related to the particular video is transmitted to client 120 over network 118.

Presentation of video and video information may be organized and presented to a user based on correlation established by whether the particular video item is a component of the same video course as one or more other videos, video content subject matter relevancy between the particular video item and one or more other videos, the one or more other videos has the same or similar creator/author as the particular video item, user profile information, user system configurations, user behavior/activity, and user behavior/activity of other users within the user's network, and multiple other factors. For example, if a video item is classified as non-standalone, then the video item is recommended to the user along with other videos from the same video course as the particular video item. If a video item is classified as standalone, then the video item may be presented to the user along with other videos deemed relevant based on various factors.

In an embodiment, system 100 performs analysis on online behavior of different users to determine whether each user is interested in standalone content. For example, past analysis of user consumption of multiple video items is performed to determine a number or percentage of video items, that a user viewed, that are classified as standalone. If it is determined that more than a certain threshold (e.g., 70%) of video items that a particular user viewed are standalone, then the analyzer tool 102 (or another component of system 100) determines to select mainly standalone video items as recommendations to present on a computing device of the particular user. In a related embodiment, the percentage of video consumption of standalone video items to non-standalone video items determines the mix of standalone v. non-standalone video items to present as recommendations or options. For example, if 20% of the video items a user views are standalone, then 20% of the video items that are recommended to the user are standalone.

In an embodiment, the standalone classification model comprises a plurality of decision trees that are trained using one or more machine learning techniques that include a gradient boosting technique and a pruning technique utilizing classification and regression.

Figure 3:
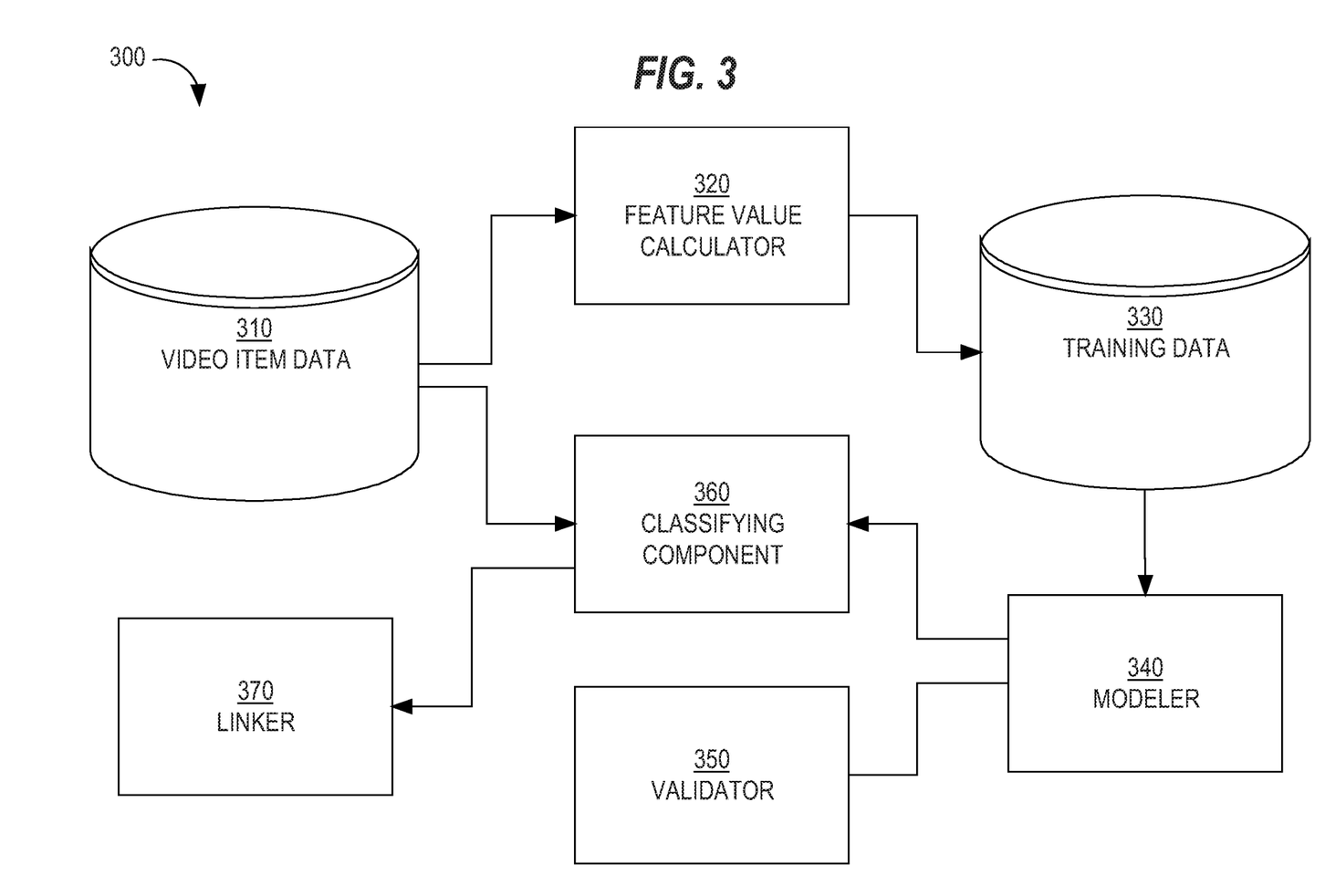
FIG. 3 is a block diagram that depicts an example classifying system for standalone video classification, in an embodiment.

FIG. 3 is a block diagram that depicts an example standalone classification system 300 for classifying videos, in an embodiment.

System 300 includes video item data 310, feature value calculator 320, training data 330, modeler 340, validator 350, classifying component 360, and linker 370. Feature value calculator 320, modeler 340, validator 350, classifying component 360, and linker 370 are implemented in software, hardware, or any combination of software and hardware.

Although different elements of system 300 are depicted as single entities, each element may be implemented on either a single computing device or across multiple computing devices. Also, multiple elements (e.g., classifying component 360 and linker 370) may be implemented on the same computing device. Even though FIG. 3 depicts elements as being connected to one another, each connection might not be a direct connection, but could represent one or more intermediate hardware and/or software elements.

Video item data 310 includes data about each video item of videos within content database 112. Different portions of video item data 310 may have been collected by data collector 116 from different data sources, whether internal or external, such as third-party data repositories containing video items and other video data. Video item data 310 also indicates, for each video item, one or more categories of the video items and feature values. For example, video item data 310 may indicate that the particular video it belongs to contains content relating to science. The video item data is associated with a category named "Science" that associates with video items of other videos that contain content relating to science. If a video item is associated with multiple categories, then the multiple categories may be categories of the video item at different times in the past. For example, if a video item indicates that the particular video it belongs to contains content relating to the "Science" category and at a later point in time indicates that the content relates to a specific category or sub-category such as "Astrophysics", the video item may be associated with both the "Science" and "Astrophysics" categories and may reflect the video item's chronological categorization history.

Feature value calculator 320 analyzes video item data 310 and other video data, and generates training data 330. For example, a feature may be the length of time based on the frequency and recency a user views the particular video item with another video item, where the more frequent and recent the particular video item and another video item are viewed together, the more likely the particular video item will be classified as non-standalone. Thus, feature value calculator 320 may analyze multiple points in which the particular video item and another video item are viewed together during a period of time (e.g., the last month). Feature value calculator 320 may extract numbers, rankings, and percentiles from the feature values and based off the extracted numbers establish a correlation between the particular video item and other video items during the period of time.

In an embodiment, the computation of feature values calculated by feature value calculator 320 is represented by a correlation algorithm that generates a correlation value. For example, if the particular video item is viewed a certain amount of times with one or more video items then the correlation value is "1", and if the particular video item is viewed with another video item below a certain number of times then the correlation value is "0".

Feature value calculator 320 may generate multiple sets of training data 330, each set is used to train or validate the standalone classification model. For example, as described in more detail below, one part of training data 330 may be used to train a classification model for a particular set or class of video items and another part of training data 330 may be used to train a classification model for a separate set or class of video items. The different sets of training data may be based on different features. Thus, one set of training data may have more features than another set of training data, but some of the features used for both training sets may be the same.

Modeler 340 implements one or more machine learning techniques to generate a standalone classification model based on training data 330, or at least a portion thereof. One machine learning technique involves generating random values for initial coefficient values for the features. The random values may be constrained to a certain range, such as between 0 and 1 or between −10 and 10.

Validator 350 validates the generated standalone classification model using a portion of training data 330, preferably a portion that was not used to train the standalone classification model. Validator 350 determines, given a particular p-cutoff, a precision rate and a recall rate of the classification model. If the precision rate or recall rate is less than a particular threshold, then classifying component 360 is used to classify video items whose data may be reflected in video item data 310 or whose data may be stored separately. For example, feature value calculator 320 may (1) generate feature values based on data about video items (e.g., reflected in video item data 310, as depicted in FIG. 3) that are to be classified and (2) store the feature values for those video items in storage to which classifying component 360 has access. Alternatively, instead of a pull model approach where classifying component 360 retrieves the feature values from storage, feature value calculator 320 may transmit ("push") the feature values to classifying component 360 for classifying the feature values.

Embeddings

In an embodiment, data extracted from a video item may form multiple groups of clusters of embeddings containing words/phrases and topics within the transcript. The average of the groups is calculated and a number of features are generated that equate to the number of cluster groups multiplied by the size of the vector comprising the embeddings. Based on the features, training data is generated and may be filtered to distinguish between relevant and non-relevant generated features.

Different Classification Models

In an embodiment, multiple standalone classification models (whether rule-based or machine-learned) are constructed. Videos may be classified based on different criteria, such as type of attribute.

"Type" may refer to the type of content, such as text, audio, or video, or to a file type. For example, one standalone classification model may be constructed for textual content items (or content items whose primary content is text), another standalone classification model may be constructed for audio content items (or content items whose primary content is audio), and another standalone classification may be constructed for visual content items (or content items whose primary content is visual.

"Type" may refer to type of subject matter. For example, some feature values may be associated with one or more videos based on the subject/topic covered within the video; some feature values may be based on pre-defined phrases that indicate a co-pendency between a video item and one or more other videos, each containing information pertaining to the subject or metadata associated with the video item, at least some of which information was provided by the user, such as results based on a search by client 120 on network 118.

One reason for constructing different standalone classification models for different sets of content items is because some features may be applicable to some set or class of content items or video data but not other sets or classes.

Another reason for constructing different standalone classification models is because different types of content items may have different structure and formatting and/or different type/variety of content.

Presenting Information about Standalone Videos

In an embodiment, the class to which a video item is assigned dictates how information about the video item is presented. If a video item is classified as a standalone video, then information about the video item is presented in a first manner. If a video item is classified as a non-standalone video, then information about the video item is presented in a second/different manner. For example, a web page may comprise multiple portions that includes a video recommendations portion. The video recommendations portion may display a listing of only standalone videos. If a user selects a name in the listing, then more detailed information about the selected standalone video is displayed (e.g., course-level information about the course to which the selected standalone video belongs) and, optionally, the selected standalone video begins playing. Alternatively, another instance of user input is required to begin playing the selected standalone video.

As another example, the video recommendations portion may display a listing of standalone videos and non-standalone videos. In this example, standalone videos are visually distinguished from each course-level listing, such as through text indicating the classifications (e.g., "Standalone" or "Course"), color, and/or graphics.

In an embodiment, the class to which a video item is assigned dictates who will receive information about the video item. By logging which users watch certain classes of videos, the system can intelligently recommend appropriate content to those users. For example, if over 75% of video items that a user watches are standalone videos, then at least 75% of video recommendations presented by the system to the user are standalone videos. As another example, if a user spends the vast majority of his/her time watching non-standalone videos, then only (or primarily) course-level recommendations are presented to the user.

In an embodiment, standalone videos are scored differently than non-standalone videos. For example, one machine-learned relevance model may generate a score for each candidate standalone video-user pair and another machine-learned relevance model may generate a score for each candidate video course-user pair, where the feature values pertaining to features of the user in each pair are the same. For example, the top N scored candidate standalone videos are presented to the user (e.g., in response to a content request) and the top M scored candidate video courses are presented to the user. The selected videos and courses may be presented concurrently and either separately on the same page (e.g., in different non-overlapping portions of the page) or together (e.g., interleaved). In a related embodiment, the same machine-learned relevance model is used to generate scores for both standalone videos and videos courses (e.g., regardless of whether the courses contain standalone videos). This may be possible if the features of the machine-learned model are applicable to both individual videos and individual courses (that comprise multiple videos), such as topics, author, industry, skills, etc.

Video recommendations may be presented in one of numerous ways, such as on a web page requested by a user, or pushed through one or more alternate channels, such as email messages, text messages, or an online messaging service.

Benefits of Certain Embodiments

The systems and methods described herein provide improvements to optimization of classification and management of video/media content. By using a rule-based model or a machine-learned model to generate feature values of videos, an analysis is performed on video data and metadata, and classification of the video as standalone or non-standalone is based on the analysis. By optimized classification of video/media content, the system is able to provide users with a more accurate selection of information pertaining to video/media content that identifies as part of a series or online course preventing users from having to manually search and filter through large quantities of videos. Thus, the systems and methods described herein improve the functioning of computing systems by optimizing video/media content classification that accommodates users of networks with large quantities of media.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
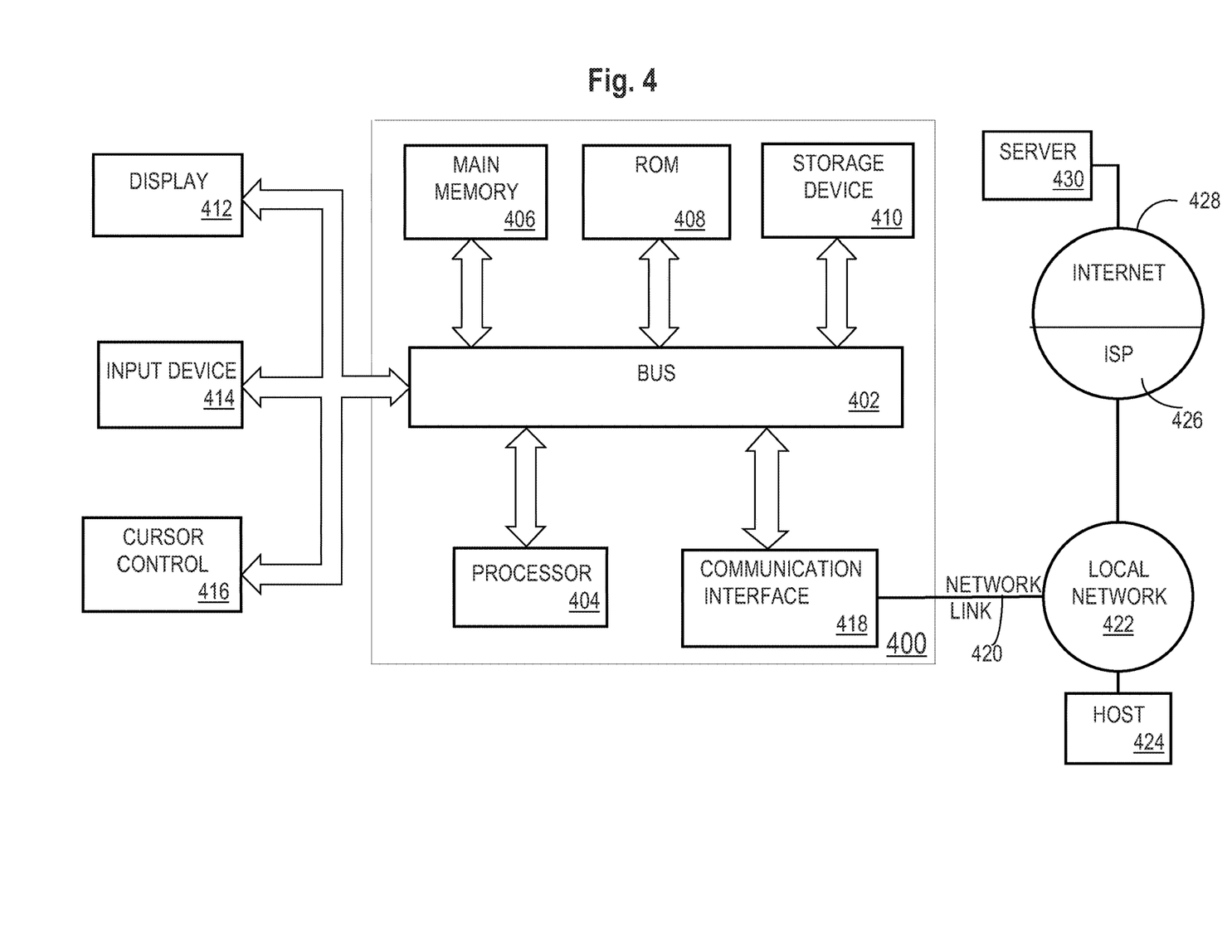
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    identifying multiple co-viewing feature values between a particular video item and a plurality of other video items;
    determining a time duration of the particular video item;
    based on the multiple co-viewing feature values and the time duration, making a determination whether the particular video item is a standalone video; and
    based on the determination, causing information about the particular video item being a standalone video to be presented to one or more users;
    wherein the method is performed by one or more computing devices.

2. The method of claim 1, further comprising:
    storing training data that comprises a plurality of training instances, wherein each training instance in the plurality of training instances corresponds to a different video item, includes a plurality of feature values pertaining to the different video item, and includes a label that indicates whether the different video item is a standalone video; and
    using one or more machine learning techniques to train a classification model based on the training data;
    wherein making the determination comprises inserting the multiple co-viewing feature values into the classification model that generates an output that is used to determine whether the particular video item is a standalone video.

3. The method of claim 1, further comprising:
    identifying text associated with the particular video item; and
    analyzing the text for one or more textual features;
    wherein making the determination is also based on the one or more textual features.

4. The method of claim 2, wherein the one or more machine learning techniques include a gradient boosting technique, wherein the classification model comprises a plurality of decision trees.

5. The method of claim 2, wherein the one or more machine learning techniques include a pruning technique, wherein the classification model comprises a plurality of decision trees.

6. The method of claim 3, wherein analyzing the text comprises determining whether the text includes one or more pre-defined phrases, wherein the one or more textual features includes whether the text includes the one or more pre-defined phrases.

7. The method of claim 3, wherein analyzing the text comprises identifying a plurality of tokens in the text, determining a token embedding for each token in the plurality of tokens, and performing an aggregation of multiple token embeddings, wherein the one or more textual features is based on output of the aggregation.

8. The method of claim 3, wherein analyzing the text comprises determining whether the text includes one or more time reference patterns, wherein the one or more textual features includes whether the text includes the one or more time reference patterns.

9. One or more non-transitory computer-readable media storing instructions which, when executed by one or more processors, cause:
    identifying multiple co-viewing feature values between a particular video item and a plurality of other video items;
    determining a time duration of the particular video item;
    based on the multiple co-viewing feature values and the time duration, making a determination whether the particular video item is a standalone video; and
    based on the determination, causing information about the particular video item being a standalone video to be presented to one or more users.

10. The one or more non-transitory computer-readable media of claim 9, wherein the instructions, when executed by the one or more processors, further cause:
    storing training data that comprises a plurality of training instances, wherein each training instance in the plurality of training instances corresponds to a different video item, includes a plurality of feature values pertaining to the different video item, and includes a label that indicates whether the different video item is a standalone video; and using one or more machine learning techniques to train a classification model based on the training data;

wherein making the determination comprises inserting the multiple co-viewing feature values into the classification model that generates an output that is used to determine whether the particular video item is a standalone video.

11. The one or more non-transitory computer-readable media of claim 9, wherein the instructions, when executed by the one or more processors, further cause:
identifying text associated with the particular video item; and
analyzing the text for one or more textual features;
wherein making the determination is also based on the one or more textual features.

12. The one or more non-transitory computer-readable media of claim 10, wherein the one or more machine learning techniques include a gradient boosting technique, wherein the classification model comprises a plurality of decision trees.

13. The one or more non-transitory computer-readable media of claim 10, wherein the one or more machine learning techniques include a pruning technique, wherein the classification model comprises a plurality of decision trees.

14. The one or more non-transitory computer-readable media of claim 11, wherein analyzing the text comprises determining whether the text includes one or more predefined phrases, wherein the one or more textual features includes whether the text includes the one or more predefined phrases.

15. The one or more non-transitory computer-readable media of claim 11, wherein analyzing the text comprises identifying a plurality of tokens in the text, determining a token embedding for each token in the plurality of tokens, and performing an aggregation of multiple token embeddings, wherein the one or more textual features is based on output of the aggregation.

16. The one or more non-transitory computer-readable media of claim 11, wherein analyzing the text comprises determining whether the text includes one or more time reference patterns, wherein the one or more textual features includes whether the text includes the one or more time reference patterns.

17. A system comprising:
one or more processors;
one or more storage media storing instructions which, when executed by the one or more processors, cause:
storing course data that identifies a plurality of video courses, each of which contains a plurality of video items;
for each video course of the plurality of video courses:
for each video item in the plurality of video items that correspond to said each video course:
identifying a plurality of feature values of said each video item,
determining, based on the plurality of feature values, whether said each video item is a standalone video;
if it is determined that said each video item is a standalone video, then storing first classification data that classifies said each video item as a standalone video; and
if it is determined that said each video item is a non-standalone video, then storing second classification data that classifies said each video item as a non-standalone video;
wherein a particular video course of the plurality of video courses includes at least one video item that is classified as a standalone video and at least one video item that is classified as a non-standalone video.

18. The system of claim 17, wherein the instructions, when executed by the one or more processors, further cause:
identifying a set of standalone videos;
determining a relevance score for each standalone video in the set of standalone videos relative to a particular user;
based on the relevance score for each standalone video in the set of standalone videos, identifying a strict subset of the set of standalone videos;
receiving a content request that is initiated by the particular user; and
in response to receiving the content request, causing the strict subset of the set of standalone videos to be presented on a computing device associated with the particular user.

19. The system of claim 17, wherein a plurality of features of the plurality of feature values include two or more of a duration, an indication of a time reference pattern, and a co-viewing attribute.

20. The system of claim 18, wherein the strict subset of the set of standalone videos is presented on a first portion of a web page, wherein the instructions, when executed by the one or more processors, further cause:
identifying a set of video courses of the plurality of video courses;
determining a second relevance score for each video course in the set of video courses relative to the particular user;
based on the second relevance score for each video course in the set of video courses, identifying a strict subset of the set of video courses; and
in response to receiving the content request, causing the strict subset of the set of video courses to be presented on a second portion, of the web page, that does not overlap with the first portion of the web page.

* * * * *